United States Patent [19]

Mafoti et al.

[11] Patent Number: 5,470,935
[45] Date of Patent: Nov. 28, 1995

[54] PREPARATION OF CAST ELASTOMERS USING 2-METHYL-1,3-PROPANEDIOL AS CHAIN EXTENDER

[75] Inventors: Robson M. Mafoti, Pittsburgh; Bruce H. Potts, Beaver, both of Pa.

[73] Assignee: Bayer Corporation, Pittsburgh, Pa.

[21] Appl. No.: 219,153

[22] Filed: Mar. 29, 1994

Related U.S. Application Data

[63] Continuation of Ser. No. 991,012, Dec. 15, 1992, abandoned.

[51] Int. Cl.$^6$ .......................... C08G 18/32; C08G 18/42; C08G 18/48; C08G 18/10
[52] U.S. Cl. ................... 528/65; 528/76; 528/80; 528/83; 528/85
[58] Field of Search .................. 528/65, 76, 80, 528/83, 85

[56] References Cited

U.S. PATENT DOCUMENTS

| | | | |
|---|---|---|---|
| 3,061,574 | 10/1962 | Smith | 528/65 |
| 4,058,506 | 11/1977 | Vaeth et al. | 528/65 |
| 4,439,599 | 3/1984 | Watanabe et al. | 528/80 |
| 4,579,928 | 4/1986 | Kay et al. | 528/65 |
| 4,604,445 | 8/1986 | Kay et al. | 528/65 |
| 4,699,968 | 10/1987 | Kay et al. | 528/65 |
| 5,109,034 | 4/1992 | Mafoti | 528/60 |
| 5,130,405 | 7/1992 | Walker et al. | 528/85 |

FOREIGN PATENT DOCUMENTS

| | | | |
|---|---|---|---|
| 61-14221 | 1/1986 | Japan | 528/85 |
| 2-36213 | 2/1990 | Japan | 528/85 |
| 4332717 | 11/1992 | Japan | 528/85 |

OTHER PUBLICATIONS

A. Awater; "PU Cast Elastomers"; *Polyurethane Handbook;* editor: G. Oertel; New York; Hanser Publishers; 1985; pp. 372–388.

Saunders et al.; "Urethane Elastomers"; *Polyurethanes, Chemistry and Technology;* New York; Interscience Publishers; 1962; pp. 273–314.

*Primary Examiner*—James J. Seidleck
*Assistant Examiner*—Rabon Sergent
*Attorney, Agent, or Firm*—Jospeh C. Gil; Richard E. L. Henderson

[57] ABSTRACT

This invention relates to a process for preparing polyurethane elastomers comprising reacting in an open mold at an isocyanate index of about 90 to about 110

(a) an isocyanate prepolymer having an isocyanate content of about 2 to about 15% by weight and having a molecular weight of from about 800 to about 5000, wherein said isocyanate prepolymer is a reaction product of
  (i) at least one organic polyisocyanate with
  (ii) at least one isocyanate-reactive compound having at least two isocyanate-reactive groups and having a molecular weight of from about 250 to about 4000;

with (b) 2-methyl-1,3-propanediol as chain extender, optionally in admixture with up to about 10 percent by weight of a different chain extender having two isocyanate-reactive hydrogen atoms and having a molecular weight of from 32 to about 250;

optionally in the presence of (c) one or more catalysts and/or other auxiliaries or additives.

8 Claims, No Drawings

PREPARATION OF CAST ELASTOMERS USING 2-METHYL-1,3-PROPANEDIOL AS CHAIN EXTENDER

This application is a continuation, of application Ser. No. 07/991,012 filed Dec. 15, 1992, abandoned.

BACKGROUND OF THE INVENTION

This invention relates to a process for preparing polyurethane cast elastomers by chain extending an isocyanate prepolymer with 2-methyl-1,3-propanediol.

The casting of polyurethane elastomers in open molds has long been known. E.g., A. Awater, "PU cast elastomers" in *Polyurethane Handbook*, ed. G. Oertel (New York: Hanser Publishers, 1985), pages 372–388; J. H. Saunders and K. C. Frisch, "Urethane Elastomers" in *Polyurethanes, Chemistry and Technology* (New York: Interscience Publishers, 1962), pages 273–314. Chain extenders used in the preparation of polyurethane cast elastomers include low molecular weight diamines (particularly aromatic diamines) and glycols (particularly 1,4-butanediol).

It was an object of the present invention to obtain cast elastomers based on glycol chain extenders having improved softness and resilience to compression. It has been found that polyurethane elastomers prepared using 2-methyl-1,3-propanediol as the chain extender are advantageously soft and resilient when compressed, yet are unexpectedly clear and transparent.

SUMMARY OF THE INVENTION

This invention relates to a process for preparing polyurethane elastomers comprising reacting in an open mold at an isocyanate index of about 90 to about 110

(a) an isocyanate prepolymer having an isocyanate content of about 2 to about 15% by weight (preferably 4 to 10% by weight) and having a molecular weight of from about 800 to about 5000 (preferably 1000 to 2200), wherein said isocyanate prepolymer is a reaction product of
  (i) at least one organic polyisocyanate with
  (ii) at least one isocyanate-reactive compound having at least two isocyanate-reactive groups and having a molecular weight of from about 250 to about 4000;
with
(b) 2-methyl-1,3-propanediol as chain extender, optionally in admixture with up to about 10 percent by weight of a different chain extender having two isocyanate-reactive hydrogen atoms and having a molecular weight of from 32 to about 250;
optionally in the presence of
(c) one or more catalysts and/or other auxiliaries or additives.

DETAILED DESCRIPTION OF THE INVENTION

Suitable isocyanate prepolymers (a) according to the invention have an isocyanate content of about 2 to about 15% by weight and a molecular weight of from about 800 to about 5000. Particularly preferred isocyanate prepolymers (a) have an isocyanate content of 4 to 10% by weight and a molecular weight of from 1000 to 2200.

Suitable polyisocyanates (a)(i) used for the preparation of prepolymers (a) include aliphatic, cycloaliphatic, araliphatic, aromatic, and heterocyclic polyisocyanates of the type described, for example, by W. Siefken in *Justus Liebigs Annalen der Chemie*, 562, pages 75 to 136. Such polyisocyanates include those having the formula

$Q(NCO)_n$ in which n is a number from 2 to about 5 (preferably 2 to 3 and more preferably 2) and Q is an aliphatic hydrocarbon group containing 2 to about 18 (preferably 6 to 10) carbon atoms, a cycloaliphatic hydrocarbon group containing 4 to about 15 (preferably 5 to 10) carbon atoms, an araliphatic hydrocarbon group containing 8 to 15 (preferably 8 to 13) carbon atoms, or an aromatic hydrocarbon group containing 6 to about 15 (preferably 6 to 13) carbon atoms. Examples of suitable isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane ("isophorone diisocyanate"; see, e.g. German Auslegeschrift 1,202,785 and U.S. Pat. No. 3,401,190); 2,4- and 2,6-hexahydrotoluene diisocyanate and mixtures of these isomers; hexahydro- 1,3- and/or -1,4-phenylene diisocyanate; dicyclohexylmethane- 4,4'-diisocyanate ("hydrogenated MDI", or "HMDI"); 1,3- and 1,4-phenylene diisocyanate; 2,4- and 2,6-toluene diisocyanate and mixtures of these isomers ("TDI"); diphenylmethane-2,4'- and/or -4,4'-diisocyanate ("MDI"); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenatton ("crude MDI"), which are described, for example, in British Patents 878,430 and 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in U.S. Pat. Nos. 3,394,164 and 3,644,457; modified polyisocyanates containing allophanate groups of the type described, for example, in British Patent 994,890, Belgian Patent 761,616, and published Dutch Patent Application 7,102,524; modified polyisocyanates containing isocyanurate groups of the type described, for example, in U.S. Pat. No. 3,002,973, German Patentschriften 1,022,789, 1,222,067 and 1,027,394, and German Offenlegungsschriften 1,919,034 and 2,004,048; modified polyisocyanates containing urea groups of the type described in German Patentschrift 1,230,778; polylsocyanates containing biuret groups of the type described, for example, in German Patentschrift 1,101,394, U.S. Pat. Nos. 3,124,605 and 3,201,372, and in British Patent 889,050; polyisocyanates obtained by telomerization reactions of the type described, for example, in U.S. Pat. No. 3,654,106; polyisocyanates containing ester groups of the type described, for example, in British Patents 965,474 and 1,072,956, in U.S. Pat. No. 3,567,763, and in German Patentschrift 1,231,688; reaction products of the above-mentioned isocyanates with acetals as described in German Patentschrift 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the polyisocyanates mentioned above. It is also possible to use mixtures of the polyisocyanates described above. Diphenylmethane- 2,4'- and/or -4,4'-diisocyanate is particularly preferred.

Suitable isocyanate-reactive compounds (a)(ii) used for the preparation of prepolymers (a) according to the invention include compounds having a molecular weight of from about 250 to about 4000 and containing at least two isocyanate-reactive groups such as hydroxyl groups, amino groups, thiol groups, carboxyl groups, or a combination thereof, the preferred compounds being those containing hydroxyl groups. Such compounds are described, for example, in German Offenlegungsschrift 2,832,253 at pages 11 to 20.

Particularly preferred isocyanate-reactive compounds contain two hydroxyl groups and have a molecular weight of from 250 to 4000 (most preferably from 1000 to 3000), including for example, hydroxyl-containing polyethers, polyesters, polyacetals, polycarbonates, polyesterethers, polythtoethers, polyamides, polyesteramides, polysiloxanes, polybutadienes, and polyacetones, and can optionally contain one or more isocyanate-reactive amino groups. Particularly preferred hydroxyl-containing compounds include polyester or polyether diols, especially those having a molecular weight of from 1000 to 3000.

Suitable hydroxyl-containing polyesters include reaction products of polyhydric alcohols (preferably diols), optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic, or heterocyclic and may be substituted, e.g., by halogen atoms, and/or unsaturated. Suitable polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, dimethyl terephthalic, and terephthalic acid bis-glycol esters. Suitable polyhydric alcohols include ethylene glycol, 1,2- and 1,3-propanediol, 1,4- and 2,3-butane diol, 1,6-hexanediol, 1,8-octanediol, neopentyl glycol, cyclohexanedimethanol, 1,4-bis(hydroxymethyl)cyclohexane, glycerol, trimethylolpropane, 1,2,6-hexanediol, 1,2,4-butanediol, trtmethylolethane, pentaerythritol, quinitol, mannitol, sorbitol, methyl glycoside, diethylene glycol, trtethylene glycol, tetraethylene glycol, polyethylene glycols, dipropylene glycol, polypropylene glycols, dibutylene glycol, and polybutylene glycols. It is, of course, also possible to use 2-methyl-1,3-propanediol for the preparation of the prepolymer. The polyesters may also contain a proportion of carboxyl end groups. Polyesters of lactones, such as ε-caprolactone, or of hydroxycarboxylic acids, such as ω-hydroxycaproic acid, may also be used. Hydrolytically stable polyesters are preferably used in order to obtain the greatest benefit relative to the hydrolyric stability of the final product. Preferred polyesters include polyesters obtained from adipic acid or isophthalic acid and straight chained or branched diols, as well as lactone polyesters, preferably those based on caprolactone and diols. Particularly preferred polyesters are those based on adipic acid and diols such as those described above.

Suitable hydroxyl-containing polyethers are known and may be prepared, for example, by the polymerization of epoxides such as ethylene oxide, propylene oxide, butylene oxide, tetrahydrofuran, styrene oxide, or epichlorohydrin, optionally in the presence of $BF_3$, or by chemical addition of such epoxides, optionally as mixtures or successively, to starting components containing reactive hydrogen atoms, such as water, alcohols, or amines. Examples of such starting components include ethylene glycol, 1,3- or 1,2-propanedio, 1,2-, 1,3-, or 1,4-butanediol, trimethylolpropane, 4,4'-dihydroxydiphenyl-propane, aniline, ammonia, ethanolamine, or ethylene diamine. Sucrose polyethers of the type described, for example, in German Auslegeschriften 1,176,358 and 1,064,938 may also be used according to the invention. Polyethers that contain predominantly primary hydroxyl groups (up to about 90% by weight, based on all of the hydroxyl groups in the polyether) are also often preferred. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patentschrift 1,152,536) are also suitable, as are polybutadienes containing hydroxyl groups. Particularly preferred polyethers include polyoxyalkylene polyether polyols, such as polyoxyethylene diol, polyoxypropylene diol, polyoxybutylene diol, and polytetramethylene diol.

Suitable polyacetals include compounds obtained from the condensation of glycols, such as diethylene glycol, triethylene glycol, 4,4'-dihydroxydiphenylmethane, and hexanediol, with formaldehyde or by the polymerization of cyclic acetals, such as trioxane.

Suitable polycarbonates include those prepared by the reaction of diols, such as 1,3-propanediol, 1,4-butanediol, 1,6-hexanediol, diethylene glycol, triethylene glycol, tetraethylene glycol, or thiodiglycol, with phosgene or diarylcarbonates such as diphenylcarbonate (German Auslegeschriften 1,694,080, 1,915,908, and 2,221,751; German Offenlegungsschrift 2,605,024).

Suitable polythioethers include the condensation products obtained by the reaction of thiodiglycol, either alone or with other glycols, dicarboxylic acids, formaldehyde, aminocarboxylic acids, or amino alcohols. The products obtained are polythio-mixed ethers, polythioether esters, or polythioether ester amides, depending on the components used.

Suitable polyester amides and polyamides include, for example, the predominantly linear condensates prepared from polybasic saturated and unsaturated carboxylic acids or the anhydrides thereof and polyvalent saturated or unsaturated amino alcohols, diamines, polyamines, and mixtures thereof.

Other suitable hydroxyl-containing compounds include polyhydroxyl compounds already containing urethane or urea groups and modified or unmodified natural polyols. Products of addition of alkylene oxides to phenol-formaldehyde resins or to urea-formaldehyde resins are also suitable. Furthermore, amide groups may be introduced into the polyhydroxyl compounds as described, for example, in German Offenlegungsschrift 2,559,372.

Polyhydroxyl compounds in which polyadducts or polycondensates or polymers are present in a finely dispersed or dissolved form may also be used according to the invention, provided that the molecular weights of from about 250 to about 4000. Polyhydroxyl compounds of this type may be obtained, for example, by carrying out polyaddition reactions (e.g., reactions between polyisocyanates and amino functional compounds) or polycondensation reactions (e.g., between formaldehyde and phenols or amines) in situ in the abovementioned hydroxyl-containing compounds. Processes of this type are described, for example, in German Auslegeschriften 1,168,075 and 1,260,142 and German Offenlegungsschriften 2,324,134, 2,423,984, 2,512,385, 2,513,815, 2,550,796, 2,550,797, 2,550,833, 2,550,862, 2,633,293, and 2,639,254. Suitable compounds may also be obtained according to U.S. Pat. Nos. 3,869,413 or 2,550,860 by mixing a previously prepared aqueous polymer dispersion with a polyhydroxyl compound and then removing water from the mixture.

Polyhydroxyl compounds modified with vinyl polymers, such as those obtained, for example, by the polymerization of styfane and acrylonitrile in the presence of polycarbonate polyols (German Patentschrift 1,769,795 and U.S. Pat. No. 3,637,909) are also suitable for the process of the invention. Synthetic resins with exceptional flame resistance may be obtained by using polyether polyols that have been modified by graft polymerization with vinyl phosphonic acid esters and optionally acrylonitrile, methacrylonitrile, acrylamide, methacryl amide, or hydroxy-functionalized acrylic or mathacrylic acid esters according to German Offenlegungsschriften 2,442,101, 2,644,922, and 2,646,141.

Suitable, although less preferred, hydroxyl-containing compounds include organofunctional polysiloxanes containing two terminal isocyanate-reactive groups and structural units of the formula —O—Si(R)$_3$ in which R denotes a $C_1$–$C_4$ alkyl group or a phenyl group, preferably a methyl group. Both the known, pure polysiloxanes containing organofunctional end groups and the known siloxane polyoxyalkylene copolymers containing organofunctional end groups are suitable starting materials according to the invention.

Also suitable are so-called amine terminated polyethers containing primary or Secondary (preferably primary) aromatically or aliphatically (preferably aliphatically) bound amino groups. Compounds containing amino end groups can also be attached to the polyether chain through urethane or ester groups. These amine terminated polyethers can be prepared by any of several methods known in the art. For example, amine terminated polyethers can be prepared from polyhydroxyl polyethers (e.g., polypropylene glycol ethers) by a reaction with ammonia in the presence of Raney nickel and hydrogen (Belgian Patent 634,741). Polyoxyalkylene polyamines can be prepared by a reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in German Patentschrift 1,193,671. Other methods for the preparation of polyoxyalkylene (polyether) amines are described in U.S. Pat. Nos. 3,155,728 and 3,236,895 and in French Patent 1,551,605. French Patent 1,466,708 discloses the preparation of polyethers containing secondary amino end groups. Also useful are the polyether polyamines described in U.S. Pat. Nos. 4,396,729, 4,433, 067, 4,444,910, and 4,530,941.

Relatively high molecular weight polyhydroxy-polyethers suitable for the process of the present invention may be converted into the corresponding anthracitic acid esters by reaction with isatoic acid anhydride. Methods for making polyethers containing aromatic amino end groups are disclosed in German Offenlegungsschriften 2,019,432 and 2,619,840 and U.S. Pat. Nos. 3,808,250, 3,975,428, and 4,016,143. Relatively high molecular weight compounds containing amino end groups may also be obtained according to German Offenlegungsschrift 2,546,536 or U.S. Pat. No. 3,865,791 by reacting isocyanate prepolymers based on polyhydroxyl polyethers with hydroxyl-containing enamines, aldimines, or kerimines and hydrolyzing the reaction product.

Aminopolyethers obtained by the hydrolysis of compounds containing isocyanate end groups are preferred amine terminated polyethers. For example, in a process disclosed in German Offenlegungsschrift 2,948,419, polyethers containing hydroxyl groups (preferably two or three hydroxyl groups) react with polyisocyanates to form isocyanate prepolymers whose isocyanate groups are then hydrolyzed in a second step to amino groups. Preferred amine terminated polyethers are prepared by hydrolyzing an isocyanate compound having an isocyanate group content of from 0.5 to 40% by weight. The most preferred polyethers are prepared by first reacting a polyether containing two to four hydroxyl groups with an excess of an aromatic polyisocyanate to form an isocyanate terminated prepolymer and then converting the isocyanate groups to amino groups by hydrolysis. Processes for the production of useful amine terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500, and 4,565,645, European Patent Application 97,299, and German Offenlegungsschrift 2,948,419, all the disclosures of which are herein incorporated by reference. Similar products are also described in U.S. Pat. Nos. 4,506, 039, 4,525,590, 4,532,266, 4,532,317, 4,723,032, 4,724,252, and 4,855,504 and in U.S. application Ser. Nos. 07/232,302 (filed Aug. 17, 1988) and 07/389,384 (filed Aug. 2, 1989).

Other suitable amine terminated polyethers include aminophenoxy-substituted polyethers described, for example, in European Patent Applications 288,825 and 268,849 and U.S. application Ser. No. 07/266,725 (filed Nov. 3, 1988), The amine terminated polyethers used in the present invention are in many cases mixtures with any of the abovementioned compounds. These mixtures generally should contain on a statistical average) two to three isocyanate reactive amino end groups.

General discussions or representative hydroxyl-containing compounds that may be used according to the present invention can be round, for example, in *Polyurethanes, Chemistry and Technology* by Saunders and Frisch, Interscience Publishers, New York, London, Volume [, ]962, pages 32–42 and pages 44–54, and Volume II, 1964, pages 5–6 and 198–199, and in *Kunststoff-Handbuch*, Volume VII, Vieweg-Höchtlen, Carl-Hanser-Verlag, Munich, 1966, on pages 45 to 71.

2-Methyl-1,3-propanediol is generally the only chain extender (b) used in the process of the invention. It is however, also possible to use mixtures of 2-methyl-1,3-propanediol with up to about 10 percent by weight (preferably 5 percent by weight) of chain extenders other than 2-methyl-1,3-propanediol. Suitable such chain extenders are compounds having two isocyanate-reactive hydrogen atoms, preferably hydroxyl groups and amino groups, and having a molecular weight of from 32 to 250. Although chain extenders containing amino groups can be used, diols are preferred. Examples of suitable diol chain extenders include 1,2-ethanediol, 1,2- and 1,3-propylene glycol, 1,4- and 2,3-butylene glycol, 1,6-hexanediol, 1,8-octanediol, neopentyl glycol, cyclohexanedimethanol, and 1-methyl -1,3-propanediol.

Suitable catalysis used as optional component (c) in the process of the invention include tertiary amines such as triethylamine, tributylamine, N-methylmorpholine, N-ethylmorpholine, N,N,N',N'-tetramethylethylene diamine, pentamethyldiethylene triamine, and higher homologs (German Offenlegungsschriften 2,624,527 and 2,624,528), 1,4-diazabicyclo-[ 2.2.2]octane, N-methyl -N'-(dimethylaminoethyl)piperazine, bis(dimethylaminoalkyl)piperazines (German Offenlegungsschrift 2,636,787), N,N-dimethylbenzylamine, N,N-dimethylcyclohexylamine, N,N-diethylbenzylamine, bis(N,N-diethylaminoethyl) adipate, N,N,N',N'-tetramethyl-1,3-butanediamine, N,N-dimethyl-β-phenylethylamine, 1,2-dimethylimidazole, 2-methylimidazole, monocylic and bicyclic amidines (German Offenlegungsschrift 1,720,633), bis(dialkylamino)alkyl ethers (U.S. Pat. No. 3,330,782, German Auslegeschrift 030,558, and German Offenlegungsschriften 1,804,361 and 2,618,280), and tertiary amines containing amide groups (preferably formamide groups) according to German Offenlegungsschriften 2,523,633 and 2,732,292. The catalysis used may also be the known Mannich bases of secondary amines (such as dimethylamine) and aldehydes (preferably formaldehyde) or ketones (such as acetone) and phenols.

Sila-amines containing carbon-silicon bonds may also be used as catalysts, for example, those described in German Patentschrift 1,229,290 (corresponding to U.S. Pat. No. 3,620,984). Examples or suitable sila-amines include 2,2,4-trimethy-2-silamorpholine and 1,3-dimethylaminomethyl tetramethyldisiloxane.

Other suitable catalysts (c) include organic metal compounds, especially organic tin compounds. Suitable organic tin compounds include those containing sulfur, such as dioctyl tin mercaptide (German Auslegeschrift 1,769,367 and U.S. Pat. No. 3,645,927), and, preferably, tin(II) salis of carboxylic acids, such as tin(II) acetate, tin(II) octoate, tin(II) ethylhexoate, and tin(II) laurate, as well as tin(IV) compounds, such as dibutyltin dilaurate.

Any of the above-mentioned catalysis may, of course, be used as mixtures.

Further representatives of catalysis to be used according to the invention and details concerning their mode of action are described in Kunsistoff Handbuch, Volume VII, published by Vieweg and Höchtlen, Carl Hanser Verlag, Munich, 1966, for example, on pages 96 to 102.

If used at all, the catalysis are generally used in a quantity ranging from about 0.01 to about 0.5% by weight, based on the quantity or prepolymer.

Other auxiliary agents and additives may optionally also be used in component (c) in the process of the invention. Suitable auxiliary agents and additives may include, for example, internal mold release agents, blowing agents, surface-active additives, cell regulators, pigments, dyes, UV stabilizers, plasticizers, fungistatic or bactertostatic substances, and fillers, such as those described in European Patent Application 81,701 at column 6, line 40, to column 9, line 31. When used, the preferred auxiliary agents and additives include known fillers and/or reinforcing substances, such as barium sulfate, kieselguhr, whiting, mica, and especially glass fibers, liquid crystal fibers, glass flakes, glass balls, aramide fibers, and carbon fibers. These fillers and/or reinforcing materials may be added in quantities of up to about 20% by weight (preferably up to 10% by weight) based on the total quantity of filled or reinforced product.

The process of the invention can be carried out using the prepolymer or semiprepolymer process. In the prepolymer method, a prepolymer is formed by reacting the polyisocyanate with a portion of the isocyanate-reactive components. It is possible, although less preferred, to mix a portion of 2-methyl-1,3-propanediol with the isocyanate-reactive component as long as the specified amount is always used as the chain extender. The prepolymer is then mixed with chain extender (b) and allowed to react in a suitable open mold. Suitable mold materials include metals (for example, aluminum) or plastics (for example, epoxide resin). External release agents, such as silicone oils, are often used during the molding process. It is, however, also possible to use so-called "internal release agents", optionally in admixture with external release agents, as described, for example, in German Offenlegungsschriften 2,121,670 and 2,307,589.

The less preferred semiprepolymer method is similar to the prepolymer method except that a portion of the organic polyisocyanate remains unreacted. That is, the isocyanate component is a mixture of unreacted polyisocyanate and true prepolymer. As in the prepolymer method, the semiprepolymer is allowed to react with the chain extender to form the polyurethane elastomer product.

When carrying out the process of the present invention, the quantity of polyisocyanate prepolymer should preferably be such that the isocyanate index is from 90 to 110 preferably 100 to 105. By "isocyanate index" is meant the quotient of the number of isocyanate groups divided by the number of isocyanate-reactive groups, multiplied by 100.

The in-mold reaction is generally carried out in heated mold at a temperature of about 80° C. to about 130° C., preferably 90° C. to 110° C. After the polymer-forming reaction is complete, the resultant elastomers are post-cured, typically at a temperature of about 90° C. to about 120° C.

Elastomers prepared according to the invention using 2-methyl-1,3-propanediol as the chain extender are soft and have an excellent capacity to rebound after repeated compressions. Because elastomers prepared according to the invention are clear and transparent, they are particularly suited for applications for which transparency is important, such as encapsulated electrical components, medical catheters. The elastomers can, of course, also be used in applications for which transparency is not important, such as the manufacture of shoe soles and other articles that can be prepared by the casting technique.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Examples 1 to 10

Examples 1 to 10 describe the preparation of polyurethane cast elastomers based on the use of 2-methyl-1,3-propanediol as a chain extender but not as a component of the isocyanate prepolymer.

The following isocyanate prepolymers were used to prepare the cast elastomers of Examples 1 to 10.

Prepolymer A

Reaction product of 4,4'-diisocyanatodiphenylmethane with a polytetramethylene diol having a molecular weight of 2000; NCO content about 9.5%.

Prepolymer B

Reaction product of 4,4'-diisocyanatodiphenylmethane with a polypropylene diol having a molecular weight of 1000; NCO content about 9.22%.

Prepolymer C

Reaction product of 4,4'-diisocyanatodiphenylmethane with a polyethylene adipate diol having a molecular weight of 1000; NCO content about 6.5%.

Prepolymer D

Reaction product of 4,4'-diisocyanatodiphenylmethane with a poly(ethylene/butylene) adipate diol having a molecular weight of 2000 (ethylene/butylene ratio about 1:1); NCO content about 6% (available as DESMOPHEN® 2001K from Bayer AG, Germany).

Prepolymer E

Reaction product of toluene diisocyanate (80% 2,4-isomer and 20% 2,6-isomer) with a 1:1 mixture (by weight) of a polyethylene adipate diol having a molecular weight of 1000 and a polyethylene adipate diol having a molecular weight of 2000; NCO content about 5%.

The storage stable prepolymers A to E were warmed to about 90° C. and degassed in an oven. The prepolymers were then allowed to react at an isocyanate index of 105 with either 2-methyl-1,3-propanediol (according to the invention) or 1,4-butanediol (comparison) as indicated in Table 1. The resultant polymer was quickly transferred to a hot mold and placed in an oven heated at about 120° C. The reaction mixtures generally solidified in about ten minutes. The resultant elastomers were removed from the mold after about 30 minutes and post-cured by placing in an oven heated at about 110° C. for about twelve hours. Properties of the resultant cast elastomers are listed in Table 1.

5579 g of adipic acid. About 1350 g of water were collected. The resultant polyester diol had a hydroxyl number of 56 (molecular weight ca. 2000) and an acid number of 1.7.

Isocyanate-terminated prepolymers based on polyesters (a) and (b) and 4,4'-diisocyanatodiphenylmethane were prepared as follows:

Prepolymer F

Polyester (a) (1379 g) was slowly added at 60° C. to rapidly stirred liquid 4,4'-diisocyanatodiphenylmethane (721 g). After addition was completed, the reaction mixture was maintained at a temperature of 60° C. for one hour. The resultant prepolymer had an isocyanate content of 6% by weight.

Prepolymer G

The method used to prepare Prepolymer F was repeated except for using 1533 g of polyester (b) and 567 g of 4,4'-diisocyanatodiphenylmethane. The resultant prepolymer had an isocyanate content of 5.95% by weight.

The storage stable prepolymers F and G were warmed to about 90° C. and degassed in an oven and then allowed to react at an isocyanate index of 105 with either 2-methyl-1,

TABLE 1

Polyurethanes prepared according to Examples 1 to 10

| | Examples | | | | | | | | | |
|---|---|---|---|---|---|---|---|---|---|---|
| | 1 | 2 | 3 | 4 | 5 | 6 | 7 | 8 | 9 | 10 |
| Prepolymer | A | A | B | B | C | C | D | D | E | E |
| Extender[1] | BD | MPD | BD | MPD | BD | MPD | BD | MPD | BD | MPD |
| NCO content (%) | 9.6 | 9.6 | 9.2 | 9.2 | 6.03 | 6.03 | 6.8 | 6.8 | 4.8 | 4.8 |
| Shore A hardness | 90 | 84 | 76 | 61 | 86 | 87 | 90 | 68 | 55 | 45 |
| Tensile strength (MPa) | 28.6 | 31.1 | 19.8 | 19.0 | 51.9 | 41.8 | 40.2 | 28.5 | 19.5 | 9.0 |
| Tensile modulus (MPa): | | | | | | | | | | |
| At 100% | 8.3 | 5.6 | 5.0 | 3.5 | 5.6 | 3.4 | 5.5 | 2.3 | 1.6 | 1.1 |
| At 200% | 11.1 | 8.3 | 10.0 | 6.9 | 8.3 | 4.9 | 7.5 | 3.0 | 2.1 | 1.4 |
| At 300% | 14.6 | 12.2 | 17.2 | — | 13.9 | 8.4 | 10.2 | 4.2 | 2.6 | 1.5 |
| Elongation at break (%) | 480 | 500 | 330 | 300 | 570 | 500 | 550 | 570 | 600 | 710 |
| Die C tear (N/mm) | 88.2 | 63.9 | 33.6 | 21.0 | 89.0 | 60.4 | 80.0 | 38.7 | 28.7 | 18.4 |
| Split tear (N/mm) | 16.5 | 14.7 | 9.5 | 17.7 | 31.2 | 18.7 | 28.9 | 13.0 | 7.2 | 8.2 |
| Compression set (%) | 29 | 35 | 51.7 | 10.4 | 20.1 | 14.8 | 35.8 | 31.8 | 19 | 30 |
| Physical appearance[2] | OP | CLR | OP | CLR | OP | CLR | OP | CLR | OP | CLR |

[1]BD represents 1,4-butanediol (comparison) and MPD represents 2-methyl-1,3-propanediol.
[2]OP represents optically opaque product and CLR represents optically clear product.

Examples 11–14

Examples 11–14 describe the preparation of polyurethane cast elastomers based on the use of 2-methyl-1,3-propanediol both as a chain extender and as a component of the polyester used in the isocyanate prepolymer.

Polyester diols based on 2-methyl-1,3-propanediol were prepared as follows:

Polyester (a)

2-Methyl-1,3-propanediol (3993 g) was added to a twelve-liter three-neck flask fitted with a condenser and heated under nitrogen gas to 160° C. Adipic acid (5317 g) was slowly added with stirring and, after addition was complete, the mixture was heated to 220° C. Water generated during the esterification reaction was removed initially at atmospheric pressure and then under vacuum, with a total of 1300 g of water being collected. The resultant polyester diol had a hydroxyl number of 112.5 (molecular weight ca. 1000) and an acid number of 1.4.

Polyester (b)

The method used to prepare polyester (a) was repeated except for using 3795 g of 2-methyl-1,3-propanediol and 3-propanediol (according to the invention) or 1,4-butanediol (comparison) as indicated in Table 2. The resultant polymer molded and post-cured as described above for Examples 1–10. Properties of the resultant cast elastomers are listed in Table 2.

TABLE 2

Polyurethanes prepared according to Example 11 to 14

| | Examples | | | |
|---|---|---|---|---|
| | 11 | 12 | 13 | 14 |
| Prepolymer | F | F | G | G |
| Extender[1] | BD | MPD | BD | MPD |
| NCO content (%) | 6.0 | 6.0 | 5.95 | 5.95 |
| Shore A hardness | 87 | 85 | 89 | 87 |
| Tensile strength (MPa) | 17.2 | 10.3 | 11.1 | 23.4 |
| Tensile modulus (MPa) | | | | |
| At 100% | 6.0 | 6.1 | 4.1 | 3.1 |
| At 200% | 7.8 | 7.7 | 5.3 | 4.3 |
| At 300% | 9.7 | 8.8 | 6.4 | 6.0 |

TABLE 2-continued

Polyurethanes prepared according to Example 11 to 14

|  | Examples | | | |
| --- | --- | --- | --- | --- |
|  | 11 | 12 | 13 | 14 |
| Elongation at break (%) | 530 | 440 | 710 | 560 |
| Die C tear (N/mm) | 58.7 | 56.1 | 51.5 | 53.3 |
| Split tear (N/mm) | 34.6 | 35.2 | 21.5 | 24.2 |
| Compression set (%) | 83.6 | 76 | 75.1 | 55 |
| Physical appearance[2] | OP | CLR | OP | CLR |

[1] BD represents 1,4-butanediol (comparison) and MPD represents 2-methyl-1,3-propanediol.
[2] OP represents optically opaque product and CLR represents optically clear product.

In general, the use of 2-methyl-1,3-propanediol as the chain extender gave softer elastomers than did 1,4-butanediol (as evidenced by generally lower Shore A hardness values) and elastomers having improved ability to rebound after repeated compressions (as evidenced by generally lower compression sets). In addition, the use of 2-methyl-1,3-propanediol as the chain extender gave clearer, transparent elastomers. The data in Table 2 show that even when 2-methyl-1,3-propanediol is used in the preparation of the prepolymer, improved compression sets and optical clarity are obtained when using 2-methyl-1,3-propanediol instead of 1,4-butanediol as the chain extender.

What is claimed is:

1. A process for preparing transparent polyurethane elastomers having tensile strengths ranging from 9 MPa to 42 MPa comprising reacting in a open mold at an isocyanate index of 90 to 110
    (a) an isocyanate prepolymer having an isocyanate content of 2 to 15% by weight and having a molecular weight of from 800 to 5000, wherein said prepolymer is a reaction product of
        (i) at least one organic polyisocyanate with
        (ii) at least one isocyanate-reactive compound having at least two isocyanate-reactive groups and having a molecular weight of from 250 to 4000 selected from the group consisting of (1) polyethers, (2) polyesters prepared by reaction of polyhydric alcohols with polybasic carboxylic acids, polybasic carboxylic acid anhydrides, or polybasic carboxylic acid esters, and (3) mixtures thereof;
with
    (b) 2-methyl-1,3-propanediol as chain extender, optionally in admixture with up to 10 percent by weight of a different chain extender having two isocyanate-reactive hydrogen atoms and having a molecular weight of from 32 to 250;
optionally in the presence of
    (c) one or more catalysis and/or additives, thereby giving a transparent polyurethane elastomer having a tensile strength of 9 MPa to 42 MPa.

2. A process according to claim 1 wherein the organic polyisocyanate is diphenylmethane-2,4'- and/or -4,4'-diisocyanate.

3. A process according to claim 1 wherein the isocyanate-reactive compound is a polyester or polyether diol.

4. A process according to claim 3 wherein the polyester or polyether diol has a molecular weight of from 1000 to 3000.

5. A process according to claim 1 wherein the isocyanate prepolymer (a) has an isocyanate content of 4 to 10% by weight and has a molecular weight of from 1000 to 2200.

6. A process according to claim 1 wherein 2-methyl-1,3-propanediol is the only chain extender used in step (b).

7. A polyurethane elastomer prepared by the process of claim 1.

8. A process according to claim 1 for preparing transparent polyurethane elastomers having tensile strengths ranging from 9 MPa to 42 MPa comprising reacting in an open mold at an isocyanate index of 90 to 110
    (a) an isocyanate prepolymer having an isocyanate content of 4 to 10% by weight and having a molecular weight of from 1000 to 2200, wherein said isocyanate prepolymer is a reaction product of
        (i) diphenylmethane-2,4'- and/or-4,4'-diisocyanate with
        (ii) at least one isocyanate-reactive polyester or polyether diol having a molecular weight of from 1000 to 3000;
with
    (b) 2-methyl-1,3-propanediol as chain extender;
optionally in the presence of
    (c) one or more catalysis and/or other additives, thereby giving a transparent polyurethane elastomer having a tensile strength of 9 MPa to 42 MPa.

* * * * *